United States Patent [19]

Shaw

[11] 4,191,157

[45] Mar. 4, 1980

[54] MAGNETO DRIVE ADAPTER

[76] Inventor: David L. Shaw, 103 Washington St., Morristown, N.J. 07960

[21] Appl. No.: 940,291

[22] Filed: Sep. 7, 1978

[51] Int. Cl.² .................. F02B 77/14; F02P 1/04; H02K 7/10
[52] U.S. Cl. ................ 123/198 R; 123/149 R; 310/75 R; 180/228; 74/11
[58] Field of Search ........ 123/149 R, 149 A, 146.5 R, 123/146.5 A, 148 CC, 198 R; 74/11, 12; 310/75 R, 75 D, 83; 180/65 C, 30, 33 R, 33 B

[56] References Cited

U.S. PATENT DOCUMENTS

| | | | |
|---|---|---|---|
| 1,267,148 | 5/1918 | Deventer | 123/149 R |
| 1,513,752 | 11/1924 | Towler | 310/75 R |
| 1,919,512 | 7/1933 | Helgeby et al. | 74/12 |
| 3,910,126 | 10/1975 | Felder | 74/11 |
| 3,938,395 | 2/1976 | Henecke | 74/12 |

*Primary Examiner*—Charles J. Myhre
*Assistant Examiner*—P. S. Lall
*Attorney, Agent, or Firm*—H. Hume Mathews

[57] ABSTRACT

An adapter kit for converting a battery powered motorcycle ignition system to a magneto ignition system comprising a drive mechanism adapted to be mounted in the tachometer drive take-off port of a motorcycle for driving a magneto by the gear provided for driving the motorcycle tachometer.

2 Claims, 6 Drawing Figures

MAGNETO DRIVE ADAPTER

BACKGROUND OF THE INVENTION

Motorcycles having storage batteries and battery powered ignition systems normally are manufactured without magneto ignition systems or any means for providing a magneto ignition system. Therefore, when the owner of a motorcycle having a battery ignition system decides to convert his "bike" to a magneto ignition system, a substantial amount of machine work has been required, at great expense, and the results have been unsatisfactory in that magnetos so mounted in the past have looked like obvious "add-ons" protruding from the normal motorcycle contours, which of course is exactly what they were.

Thus, there existed a need in the prior art for a simple, inexpensive kit which could be used by a motorcycle owner to convert a motorcycle having a battery powered ignition system to one having a magneto ignition system, with the final result being a magneto ignition "bike" of good looking lines and contour, equivalent to the lines and contour of bikes completely manufactured on a mass-production basis in large scale manufacturing plants.

SUMMARY OF THE INVENTION

According to the invention, an adapter kit is provided which will at one end support a magneto of the type normally used for magneto ignition motorcycles and at the other end will fit into the hole normally provided in the cam cover of motorcycle engines for the tachometer drive.

In motorcycles, as normally manufactured, a drive outlet is provided in the upper front portion of the engine cam cover, to which the tachometer drive, leading to a tachometer normally located on the handlebars, is fitted.

The adapter kit of the present invention is so formed as to fit into this tachometer drive outlet, and is so designed that a magneto can be mounted on the adapter and driven by the same gear that previously was utilized to drive the tachometer drive shaft. The tachometer itself and the drive shaft may be omitted or, if it is to be retained, may be driven indirectly, through a drive connected with the magneto drive, preferably at a location on the top of the magneto.

The arrangement of the magneto mount and the magneto drive provided by the adapter kit of the present invention is such that both overall drive efficiency and appearance are excellent, yet the kit is simple and inexpensive both to manufacture and install.

DETAILED DESCRIPTION OF PREFERRED EMBODIMENT

Figure 1:
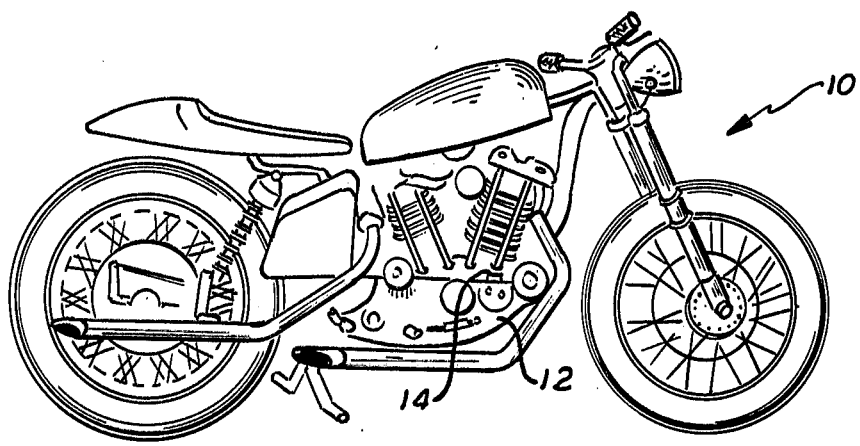
FIG. 1 is a side elevation of a motorcycle of the type to which the adapter kit of the present invention is applicable.

FIG. 1 shows a conventional motorcycle 10 having an engine crankcase 12 with a tachometer drive take-off port closed by a plug 14. When a tachometer is to be mounted on a motorcycle such as shown in FIG. 1, the plug 14 is removed and a tachometer drive is screwed into the cam cover port in place of the plug 14.

Figure 2:
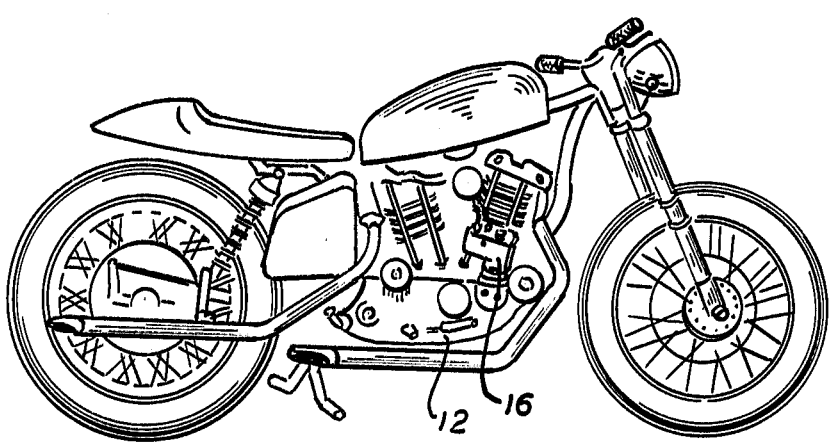
FIG. 2 is a view like FIG. 1, but with a magneto ignition installed thereon by use of the adapter kit of the present invention.
Figure 3:
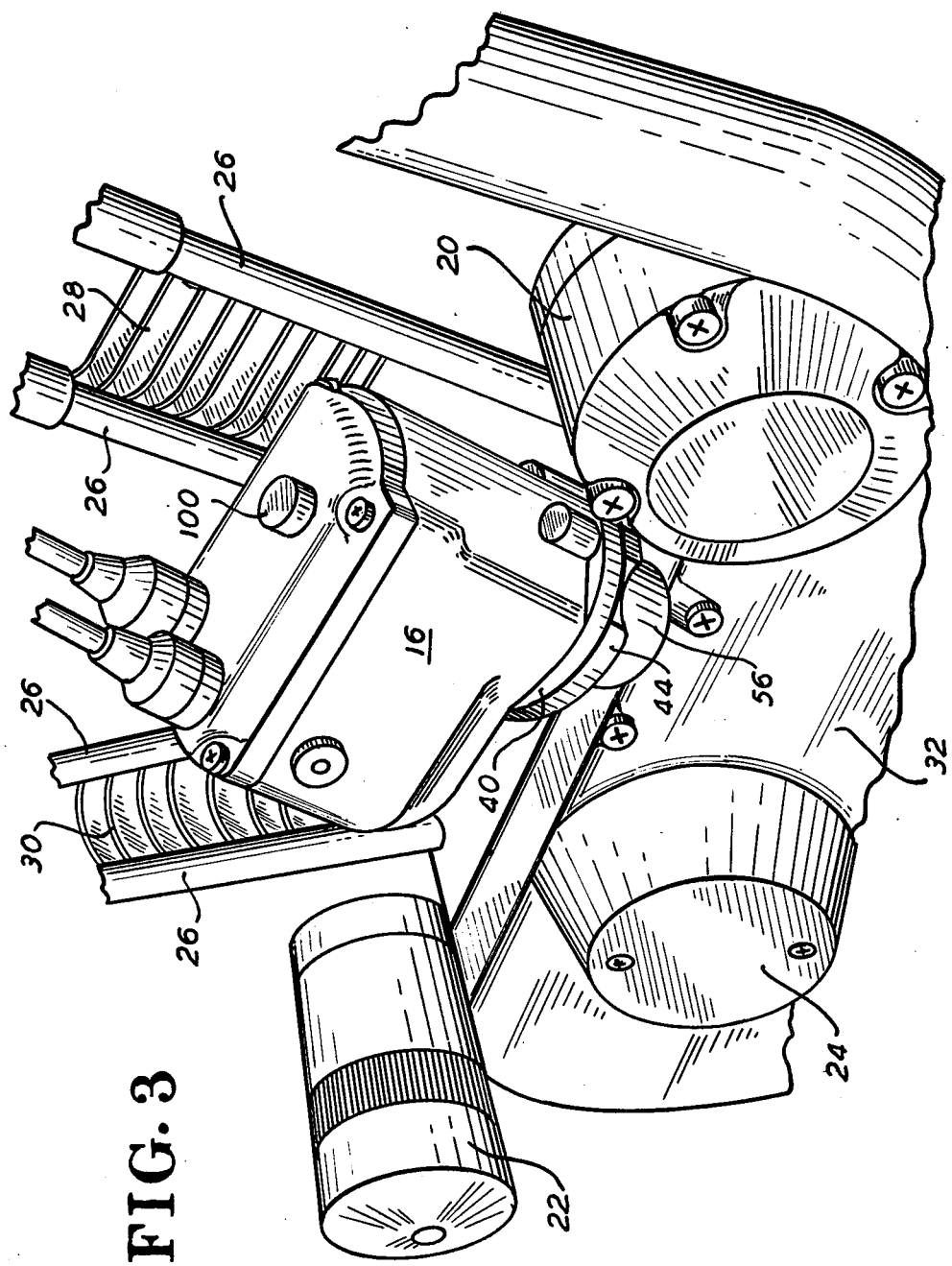
FIG. 3 is an enlarged perspective view of a portion of the engine crankcase shown in FIG. 2, having a magneto mounted thereon by the adapter kit of the present invention.
Figure 4:
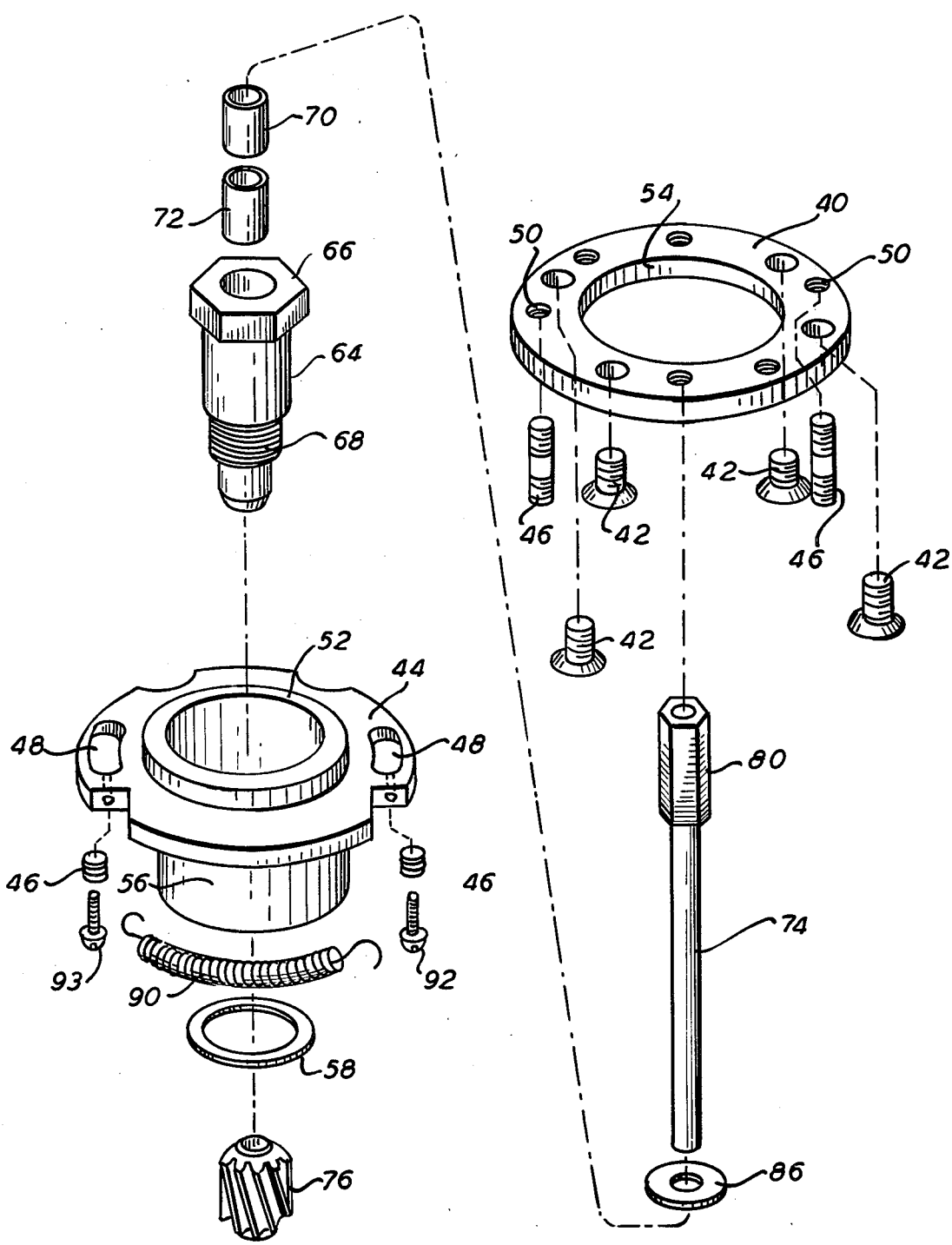
FIG. 4 is an exploded perspective view of the various parts of the adapter kit of the present invention, showing how they may be assembled to support and to drive a magneto on the motorcycle cam cover at the location of the tachometer drive take-off.
Figure 5:
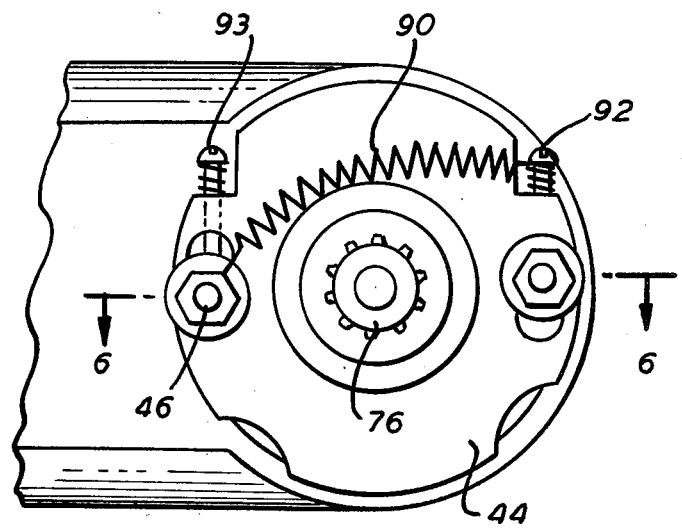
FIG. 5 is a bottom view of the adapter kit assembled with a magneto and ready for insertion in the tachometer drive hole in the motorcycle cam cover.
Figure 6:
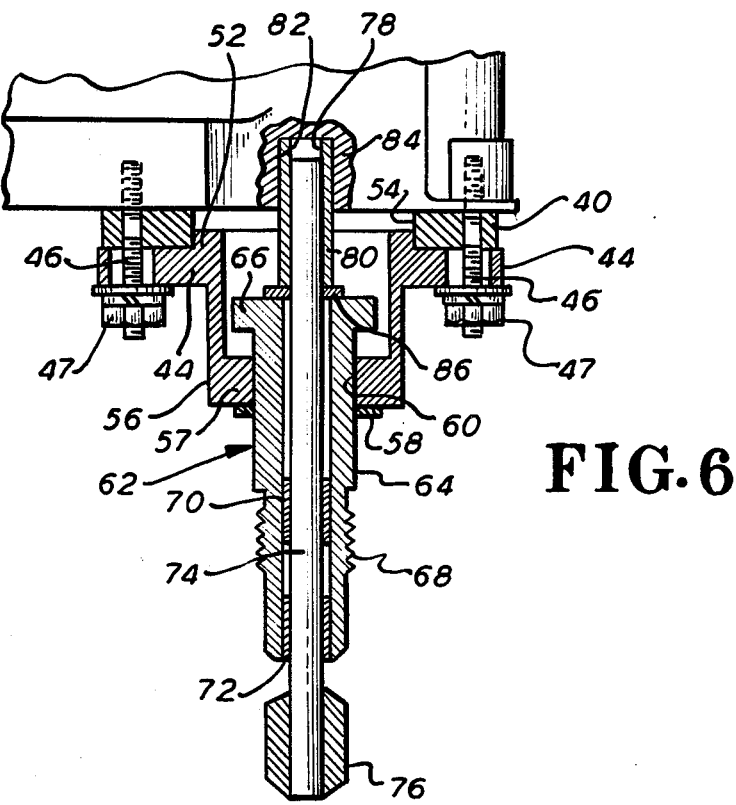
FIG. 6 is a vertical section along the lines 6—6 in FIG. 5.

By means of the adapter kit of the present invention, the parts of which are shown in FIGS. 4, 5 and 6, a magneto 16 may be mounted on, and driven through, the tachometer take-off port, so that the magneto is positioned in the location shown in FIG. 2 relative to the engine and the engine crankcase and cam cover. The enlarged view of FIG. 3 shows the magneto location more clearly, relative to the generator drive housing 20, starter 22, distributor cover 24, push rod covers 26, cylinder fins 28, 30, and cam cover 32.

The various components of the adapter kit of this invention are shown in FIGS. 4, 5 and 6. They comprise a fixed brass plate 40 attached to the bottom of magneto 16 by four machine screws 42 and a shiftable plate 44 of rigid steel material secured to the magneto and brass plate 40 by studs 46 which fit through slots 48 in the steel plate and screw into threaded holes 50 positioned in diametrically opposite locations in brass plate 40. A circular projection 52 on steel plate 44 fits snugly into a circular opening 54 in the brass plate so as to maintain the two plates in co-axial relationship, the fit being such that steel plate 44 may be shifted, or rotated a predetermined angular distance, about the common axis, to the extent permitted by the length of slots 48 through which the studs 46 extend.

A boss 56 projects from the opposite side (opposite projection 52) of steel plate 44. When the parts are assembled, in operative position, the lower face of boss 56 rests against a thin washer 58 which rests against the top surface of cam cover 32.

Boss 56 is provided with a central opening 60 which receives a sleeve 62 having an upper tubular portion 64 topped by a flange 66 and a lower screw threaded portion 68 which is designed to screw into the threaded opening (not shown) in the top of cam cover 32. This cam cover opening is the same one provided in the motorcycle, as manufactured, for receiving the tachometer drive take-off.

Within the sleeve 62 are pressed two sleeve bearings 70, 72 which rotatably support a magneto drive shaft 74, or round steel stock. A helical gear 76 formed to mesh with a companion gear in the cam drive (not shown) within the cam cover 32 is pressed and keyed to the bottom end of drive shaft 74. The top end of drive shaft 74 is pressed and fitted into the central bore 78 of a connecting member 80 having an outer surface of hexagonal cross-section, which makes a driving fit with the inner hexagonal socket 82 on the inner magneto drive shaft 84. A washer 86 is interposed between the bottom of member 80 and the top of flange 66 on the tubular portion 64 of sleeve 62.

As will be seen in FIG. 5, a tension spring 90 stretched between one of the studs 46 and a machine screw 92 attached to plate 44 tends to rotate plate 40 and magneto attached thereto clockwise (as viewed in FIG. 5). Screw 92 and a companion screw 93 opposite thereto may be screwed in or out with respect to the respective slots 48 so as to limit this motion of the magneto about the drive shaft axis, thus limiting the maximum spark advance or spark retard movements.

When sleeve 62 is screwed all the way down into the cam cover tachometer take-off port, flange 66 on the sleeve contacts and locks into fixed position against the inwardly turned flange 57 of boss 56. Thus the plate 44 will be locked in stationary position relative to the cam cover, but the plate 40 and the magneto fixed thereto can still be shifted angularly about the drive axis to provide spark advance and spark retard movements. If the nuts 47 on studs 46 are tightened to the proper tension, the operator may shift the magneto manually to the spark retard position and it will be maintained in that position, for engine starting, by the friction established by the pressure created by nuts 47. Once the engine starts, however, engine vibration will cause that friction to relax intermittently and allow the tension of spring 90 to shift (i.e., rotate) the magneto to the spark advance position for normal engine operation.

As above described, the magneto is mounted on the tachometer take-off port and driven by the tachometer drive gear, and the tachometer is omitted. However, in the event it is desired to retain the tachometer, while at the same time providing the magneto drive of the present invention, an indirect tachometer may be provided through the magneto with a drive take-off being located on top of the magneto, as shown as 100 in FIG. 3, to which the tachometer may be connected.

I claim:

1. In combination, a motorcycle engine including a cam casing having a drive take-off port and a drive gear, a magneto drive shaft mounted in said port and connected with said drive gear, a housing for rotatably supporting said drive shaft, first and second plates respectively secured to said cam casing and to a magneto, for supporting said magneto on the cam casing, and means for adjustably securing said first and second plates together for angular adjustment relative to each other for changing the timing of said magneto.

2. An adapter kit for converting a motorcycle having a tachometer drive gear and a battery powered ignition system to a magneto ignition system comprising, a drive shaft adapted to be driven at one end by said tachometer drive gear, means at the other end of said drive shaft for driving a magneto, means for mounting said magneto drive shaft on said motorcycle in the location provided for the tachometer drive so that the magneto drive shaft is driven by the gear provided for the tachometer drive, a first plate carried by said mounting means, and a second plate adapted to be attached to the magneto, said plates being angularly adjustable relative to each other for changing the timing of said magneto.

* * * * *